US012699581B2

(12) United States Patent
Hecht

(10) Patent No.: US 12,699,581 B2
(45) Date of Patent: Aug. 4, 2026

(54) RECOVERY OF STATE, CONFIGURATION, AND CONTENT FOR VIRTUALIZED INSTANCES

(71) Applicant: CyberArk Software Ltd., Petach-Tikva (IL)

(72) Inventor: Asaf Hecht, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 661 days.

(21) Appl. No.: 18/175,327

(22) Filed: Feb. 27, 2023

(65) Prior Publication Data

US 2023/0205571 A1     Jun. 29, 2023

Related U.S. Application Data

(63) Continuation-in-part of application No. 17/340,341, filed on Jun. 7, 2021, now Pat. No. 11,609,780, which is a continuation of application No. 15/929,847, filed on May 26, 2020, now Pat. No. 11,029,987, which is a continuation of application No. 16/596,476, filed on Oct. 8, 2019, now Pat. No. 10,678,586.

(51) Int. Cl.
*G06F 9/455*      (2018.01)
*G06F 8/71*       (2018.01)
*G06F 9/50*       (2006.01)

(52) U.S. Cl.
CPC ............ *G06F 9/45558* (2013.01); *G06F 8/71* (2013.01); *G06F 9/5077* (2013.01); *G06F 2009/45575* (2013.01); *G06F 2009/45587* (2013.01); *G06F 2009/45595* (2013.01)

(58) Field of Classification Search
CPC ...... G06F 9/45558; G06F 8/71; G06F 9/5077; G06F 2009/45575; G06F 2009/45587; G06F 2009/45595
See application file for complete search history.

(56) References Cited

U.S. PATENT DOCUMENTS

| | | | |
|---|---|---|---|
| 8,078,664 B2 | 12/2011 | Radia et al. | |
| 9,268,110 B2 | 2/2016 | Bueller et al. | |
| 2009/0089860 A1 | 4/2009 | Forrester et al. | |
| 2014/0181812 A1 | 6/2014 | Deshpande et al. | |
| 2015/0160959 A1 | 6/2015 | Bragstad et al. | |
| 2016/0077863 A1 | 3/2016 | Karve et al. | |
| 2016/0321455 A1* | 11/2016 | Deng ................... | G06F 3/0685 |
| 2018/0349166 A1* | 12/2018 | Movsisyan .......... | G06F 9/5088 |

* cited by examiner

*Primary Examiner* — Gregory A Kessler
(74) *Attorney, Agent, or Firm* — FINNEGAN, HENDERSON, FARABOW, GARRETT & DUNNER, LLP

(57) ABSTRACT

Disclosed embodiments relate to systems and methods for analysis of data associated with software instances. Techniques include obtaining data associated with a software instance; archiving delta data associated with software instance; analyzing one more previous states of the software instance based on the archived delta data; and performing a security action based on the analysis of the one or more previous states of the software instance based on the archived delta data.

20 Claims, 8 Drawing Sheets

100

200

202

Request for running a new container

204

Receive container information

206

Live Container

208

Deallocated Container

210

Deallocated Containers

300

400

500

600

800

810 Obtaining data associated with a software instance

820 Archiving delta data associated with the software instance

830 Analyzing previous states of the software instance based on the archived delta data 840 Performing a security action based on the analysis

RECOVERY OF STATE, CONFIGURATION, AND CONTENT FOR VIRTUALIZED INSTANCES

CROSS-REFERENCE TO RELATED APPLICATIONS

This application is a continuation-in-part and claims the benefit of priority of U.S. Nonprovisional patent application Ser. No. 17/340,341, filed Jun. 7, 2021, which is a continuation of U.S. patent application Ser. No. 15/929,847, filed on May 26, 2020, now U.S. Pat. No. 11,029,987, issued Jun. 8, 2021, which is a continuation of U.S. application Ser. No. 16/596,476, filed on Oct. 8, 2019, now U.S. Pat. No. 10,678,586, issued on Jun. 9, 2020.

BACKGROUND

In recent years, there has been increasing movement away from traditional on-premises computer networks toward cloud-based or virtual computer networks. Use of virtual machines (VMs), containers, and even serverless code has proliferated and become an integral part of IT infrastructure for all types of businesses, government agencies, and educational institutions. Through platform offerings such as Software-as-a-Service (SaaS), Infrastructure-as-a-Service (IaaS), and Platform-as-a-Service (PaaS), enterprises and other institutions are able to remotely store, process, and access data and software to run their operations.

In these modern environments, dynamic and automated processes cause the environments to change constantly. For example, the resources in an environment may be automatically spun up and down on a large scale. Examples of modern and dynamic resources are: Cloud VMs (AWS™ EC2 instances, Azure™ VMs, etc.), Containers (Docker™, etc.), Kubernetes™, etc.

However, the lifetime of these automated resources may be relatively short. After a resource is shut down, it may be deallocated and may not be reached again. Without an advanced controlling/managing/audit system, the information from the deallocated resources, e.g., containers and VMs (e.g., their data, files, RAM memory, processes, threads, network connections, etc.) no longer exists and cannot be searched, recovered, or reinstantiated.

Thus, there exist technological needs and current technological shortcomings to enable fully audited and controlled dynamic environments with the ability to fully search and recover historic states of the environments. There are also needs for technologies to perform live checks and tests on these highly dynamic resources.

Further, previous solutions were only able to make changes or provide insight after production or deployment in a dynamic environment, without the ability to take actions or provide oversight during different stages of the environment. Therefore, technological needs exist for access to the resources and changes within the dynamic environment before they are published to production or deployment. The present application allows access to earlier stages within a code development pipeline, to discover and prevent malicious and unintended software changes before the environment moves to the production stage. This will enhance security by allowing identification of malicious activities or vulnerabilities earlier on the development process. Rather than wait for code or instances to be deployed, the present techniques allow for a more efficient and secure identification and remediation of threats early in the development process. These techniques not only improve security but also reduce system overhead, allowing for quicker and more efficient control, prevention, and remediation.

SUMMARY

The disclosed embodiments describe non-transitory computer readable media, systems, and methods for enabling recovery of deactivated virtual computing instances that were previously instantiated in a dynamic virtualized computing environment. For example, in an exemplary embodiment, there may be a non-transitory computer readable medium including instructions that, when executed by at least one processor, cause the at least one processor to perform operations for enabling recovery of deactivated virtual computing instances that were previously instantiated in a dynamic virtualized computing environment. The operations may comprise identifying a status change for a virtual computing instance; archiving a plurality of environment properties representing a chain of activities comprising a plurality of activities executed by a processor of the virtual computing instance; and reactivating the virtual computing instance. Reactivating the virtual computing instance may include enabling reinstantiation of the virtual computing instance based on the plurality of environment properties and the chain of activities, where the virtual computing instance is reinstantiated to a state of the virtual computing instance at a time of the status change.

According to a disclosed embodiment, the status change comprises at least one of: a change from a run state to a pause state or a change from the run state to a stop state.

According to a disclosed embodiment, the operations further comprise storing the virtual computing instance, upon the transition to the deactivated phase, in a sandbox environment.

According to a disclosed embodiment, the plurality of activities are archived in real-time.

According to a disclosed embodiment, the operations further comprise archiving state data associated with the virtual computing instance.

According to a disclosed embodiment, the operations further comprise archiving multiple versions of the plurality of activities.

According to a disclosed embodiment, the operations further comprise storing a compressed chain of the multiple versions, the compressed chain representing one or more differences between the multiple versions.

According to a disclosed embodiment, the operations further comprise archiving pluralities of activities corresponding to a plurality of virtual computing instances.

According to a disclosed embodiment, the plurality of commands comprises at least one of: a process operation, a command executed by the processor of the virtual computing instance, and a system call.

According to a disclosed embodiment, the operations further comprise filtering the pluralities of activities based on whether the plurality of virtual computing instances have embedded credentials.

According to another disclosed embodiment, a method may be implemented for enabling recovery of deactivated virtual computing instances that were previously instantiated in a dynamic virtualized computing environment. The method may comprise identifying a status change for a virtual computing instance; archiving a plurality of environment properties representing a chain of activities comprising a plurality of activities executed by a processor of the virtual computing instance; and reactivating the virtual computing instance. Reactivating the virtual computing instance may include enabling reinstantiation of the virtual computing instance based on the plurality of environment properties and chain of activities, where the virtual computing instance is reinstantiated to a state of the virtual computing instance at a time of the status change.

According to a disclosed embodiment, the method further comprises performing audit operations on the virtual computing instance.

According to a disclosed embodiment, archiving the plurality of environmental properties further comprises: archiving a first chain of activities at a first time associated with the status change, the first chain of activities comprising a first plurality of activities; identifying a second chain of activities at a second time associated with a second status change, the second chain of activities comprising a second plurality of activities; and archiving a third chain of activities comprising a subset of the second plurality of activities, wherein the subset comprises one or more activities of the second plurality that are not in the first plurality.

According to a disclosed embodiment, the method further comprises archiving pluralities of activities corresponding to a plurality of virtual computing instances.

According to a disclosed embodiment, the method further comprises filtering the pluralities of activities by privileged activities.

According to a disclosed embodiment, the method further comprises filtering the pluralities of activities by runtime activity involving access to one or more sensitive network resources.

According to a disclosed embodiment, the reactivating of the virtual computing instance is performed based on a hook function.

According to a disclosed embodiment, the reactivating of the virtual computing instance is performed based on a request to reactive the virtual computing instance.

According to a disclosed embodiment, the reactivating of the virtual computing instance is performed based on a request to reactive a group of virtual computing instances including the virtual computing instance.

According to a disclosed embodiment, the group of virtual computing instances is associated with a DevOps process.

The disclosed embodiments also describe a non-transitory computer readable medium that, when executed by at least one processor, cause the at least one processor to perform operations for analysis of data associated with software instances comprising: obtaining data associated with a software instance, archiving, in at least one data storage system, delta data associated with the software instance, the delta data representing a plurality of differences between a first state of the data associated with the software instance and a second state of the data associated with the software instance, wherein the plurality of differences are based on a plurality of operations performed on at least one of the data associated with the software instance or the software instance, analyzing one or more previous states of the software instance based on the archived delta data, and performing a security action based on the analysis of the one or more previous states of the software instance based on the archived delta data.

The disclosed embodiments also describe a computer-implemented method for enabling storage and analysis of data associated with software instances, the operations comprising: obtaining data associated with a software instance, archiving, in at least one data storage system, delta data associated with the software instance, the delta data representing a plurality of differences between a first state of the data associated with the software instance and a second state of the data associated with the software instance, wherein the plurality of differences are based on a plurality of operations performed on at least one of the data associated with the software instance or the software instance, analyzing one or more previous states of the software instance based on the archived delta data, and performing a security action based on the analysis of the one or more previous states of the software instance based on the archived delta data.

According to a disclosed embodiment, the software instance may be represented in a continuous development or continuous deployment pipeline prior to deployment of the software instance.

According to a disclosed embodiment, the archived delta data may be stored in the at least one data storage system in associated with time information indicating when the plurality of operations were performed.

According to a disclosed embodiment, the software instance may comprise a software container.

According to a disclosed embodiment, the operations may further comprise archiving state data associated with the second state of the data associated with the software instance.

According to a disclosed embodiment, the analyzing may further comprise simulating one or more previous states of the software instance based on the archived delta data.

According to a disclosed embodiment, the simulating may further comprise simulation in a sandbox environment.

According to a disclosed embodiment, the security action may comprise at least one of an alert, a report, a blocking of an action, or a permission of an action.

According to a disclosed embodiment, the security action may be performed automatically.

According to a disclosed embodiment, the operations may further comprise deallocating the software instance and accessing archived delta data associated with the deallocated software instance.

According to a disclosed embodiment, the operations may further comprise reinstantiating the deallocated software instance based on the associated archived delta data and performing an audit on the reinstantiated software instance.

According to a disclosed embodiment, the archiving may further comprise compressing the plurality of differences between the first state of the data associated with the software instance and the second state of the data associated with the software instance into a chain of activities.

According to a disclosed embodiment, the operations may further comprise archiving multiple versions of the chain of activities, each version being associated with a different state of the data associated with the software instance.

According to a disclosed embodiment, the plurality of differences between the first state of the data associated with the software instance and the second state of data associated with the software instance may comprise at least one of: image information associated with the software instance, memory contents associated with the software instance, or configuration information associated with the software instance.

According to a disclosed embodiment, the configuration information may comprise one or more parameters of the software instance.

According to a disclosed embodiment, the security action may comprise performing an audit of the software instance.

According to a disclosed embodiment, the archiving may be performed on a periodic basis.

According to a disclosed embodiment, the archiving may further comprise continually archiving the delta data upon identification of a state change for the software instance.

According to a disclosed embodiment, the storage system may further comprise local storage or remote storage and a short term and a long term storing system.

According to a disclosed embodiment, the operations may further comprise performing an iterative security action on each of a plurality of sets of delta data associated with the software instance.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
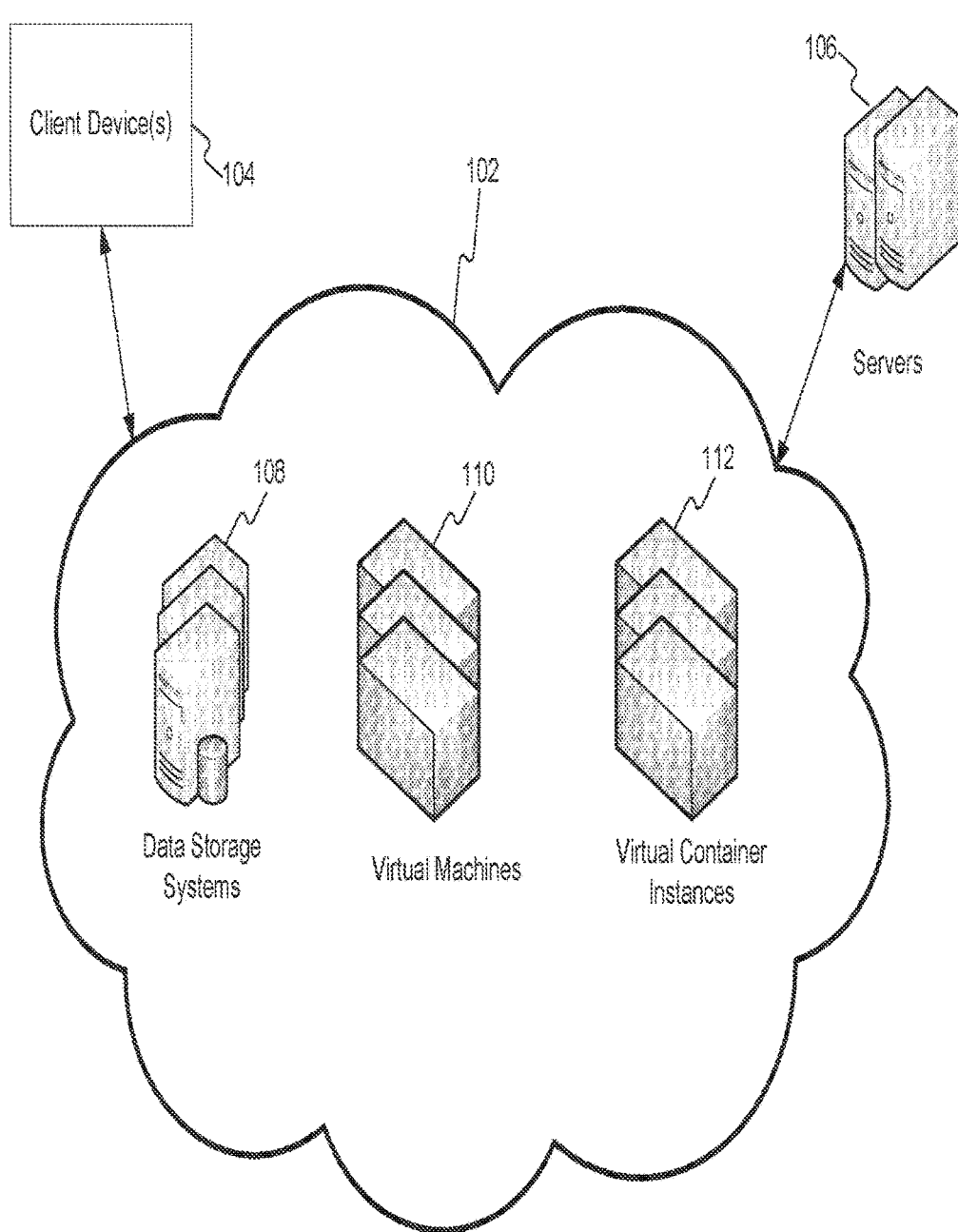
FIG. 1 is a block diagram of an exemplary system for implementing virtual computing instances in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In modern computing environments, e.g., environments implemented using IaaS (Infrastructure as a Service), PaaS (Platform as a Service), or IaaC (Infrastructure as a Code), the environments may host a number of dynamic resources, such as cloud-based VMs (AWS™ EC2 instances, Azure™ VMs, etc.), containers (e.g., Docker™, Azure™ etc.), Kubernetes™ etc., as well as various types of next-generation virtual instances. However, the lifetime of these dynamic and/or automated resources may be relatively short and, therefore, modern networks lack full audit, governance, and compliance measures over dynamic resources.

Embodiments disclosed herein describe systems and methods for restoring and relaunching deallocated resources, and performing tests and checks on dynamic resources running in a modern environment. A modern environment could have dozens or even thousands of containers, many of which may be built from the same container images. For example, every second a few containers may be newly launched, while others are shut down automatically due to the environment requirements. As discussed further below, even for short-lived virtual instances, the disclosed techniques allow for reinstantiating the instances on-demand based on the parameters and settings that the instances had during their operational period.

In some embodiments, disclosed techniques further allow an environment to meet full audit, compliance, regulation and security checks, both for containers deployed in real time and for older, possibly deactivated instances.

The techniques of enabling full recovery and relaunch of the historical states of an environment and performing live checks and tests on dynamic resources described herein overcome several technological problems relating to accessing deallocated dynamic resources and testing dynamic resources in cloud-based virtual computing networks. Dynamic resources may include, for example, virtual computing instances, virtual machines, and/or virtual containers. In contrast to existing approaches, in which information associated with deallocated resources is deleted and cannot be accessed, the techniques disclosed herein allow deallocated resources to be accessed and relaunched, thereby facilitating forensic procedures to investigate past incidents, events, or issues. Further, techniques described herein allow live audits and checks to be performed on dynamic resources without slowing the production environment or interfering with ongoing automated processes. Thus, dynamic resources may be monitored in real-time in an efficient and frictionless manner.

Reference will now be made in detail to the disclosed embodiments, examples of which are illustrated in the accompanying drawings.

FIG. 1 illustrates an exemplary system 100 for enabling recovery of deactivated virtual computing instances that were previously instantiated in a dynamic virtualized computing environment and for performing live tests on dynamic resources in a dynamic virtualized computing environment. As illustrated, system 100 may include a cloud-based, or virtualized, network 102 that is accessible to client device(s) 104 and servers 106. In various embodiments, cloud-based network 102 may be based on various types of virtual network infrastructure, such as that provided by Amazon Web Services™ (AWS), Microsoft Azure™, IBM Cloud™ and/or various other virtual network providers. Cloud-based network 102 may include one or more virtual machines 110, which may be based on virtualization tools provided by Amazon Web Services™ (AWS), Microsoft Azure™, IBM Cloud™, Google Cloud Platform™ Cisco Metapod™ Joyent™, vmWare™ or others. Similarly, virtualized network 102 may include one or more container instances 112, which may be based on the same types of virtualized deployment tools, Docker™ container tools, Kubernetes™ tools, or other similar containerization tools. Further, the virtual machines 110 and containers 112 may be, in some embodiments, next generation virtual instance types (e.g., Quarkus™ Ibmjava™ etc.). While FIG. 1 shows network 102 comprising multiple different types of virtual instances, based on different platforms, this is not required in all embodiments. Some embodiments may utilize only one type of virtual instance, or may utilize only one virtual platform type.

Cloud network 102 may also include one or more data storage systems 108. In some embodiments, virtual machines 110 and container instances 112 may access storage systems 108 to obtain data, provide data, obtain application code, provide application code, etc. Further, in some embodiments, data storage systems 108 may be part of the cloud infrastructure (e.g., part of the host system, or storage devices operating as a SaaS or IaaS platform for client device(s) 104, etc.). Further, data storage systems 108 may be configured to participate in the processes described below in connection with FIGS. 2-7. For example, data storage systems 108 may store data regarding the operational characteristics of particular virtual instances 110/112. In alternate embodiments, data storage systems 108 may be external to network 102.

In various embodiments, cloud-based network 102 may include only one type of virtualized instance (e.g., only virtual machines, only containers, etc.), while in other embodiments cloud-based network 102 includes combinations of different types of virtualized instances. Cloud-based network 102 may be a private cloud network, a public cloud network, or a hybrid private-public cloud network. Numerous types of functionality and use may be made of cloud-based network 102, such as data storage, data retrieval, application storage, application execution, computation, data backup, etc.

In some embodiments, various types of client devices 104 may be configured to access cloud-based network 102. Examples include smartphones, smart jewelry or clothing, personal computers, tablets, and others. Of course, numerous other types of client devices 104 may access cloud-based network 102 as well (e.g., IoT sensors or devices, smart home appliances, network-connected vehicles, building security systems, home automation systems, transportation communication systems, etc.). Likewise, servers 106 may access virtualized network 102 as well. Servers 106 may be, for example, web servers, application servers, on-premises corporate servers, cloud-based servers, etc. In some embodiments, client device(s) 104 and servers 106 may be part of the same cloud-based network as network 102, a different cloud-based network, or various private or on-premises networks.

In accordance with FIG. 1, virtual instances 110/112 may be continuously being spun up, configured, reconfigured, and terminated based on factors such as demand for the instances, network bandwidth or throttling limitations, security rules, usage activity by applications or users, and more.

Many of the virtual instances 110/112 may share common parameters or configuration settings (e.g., instances based on the same source image), while many may be unique and have particularized settings.

Figure 2:
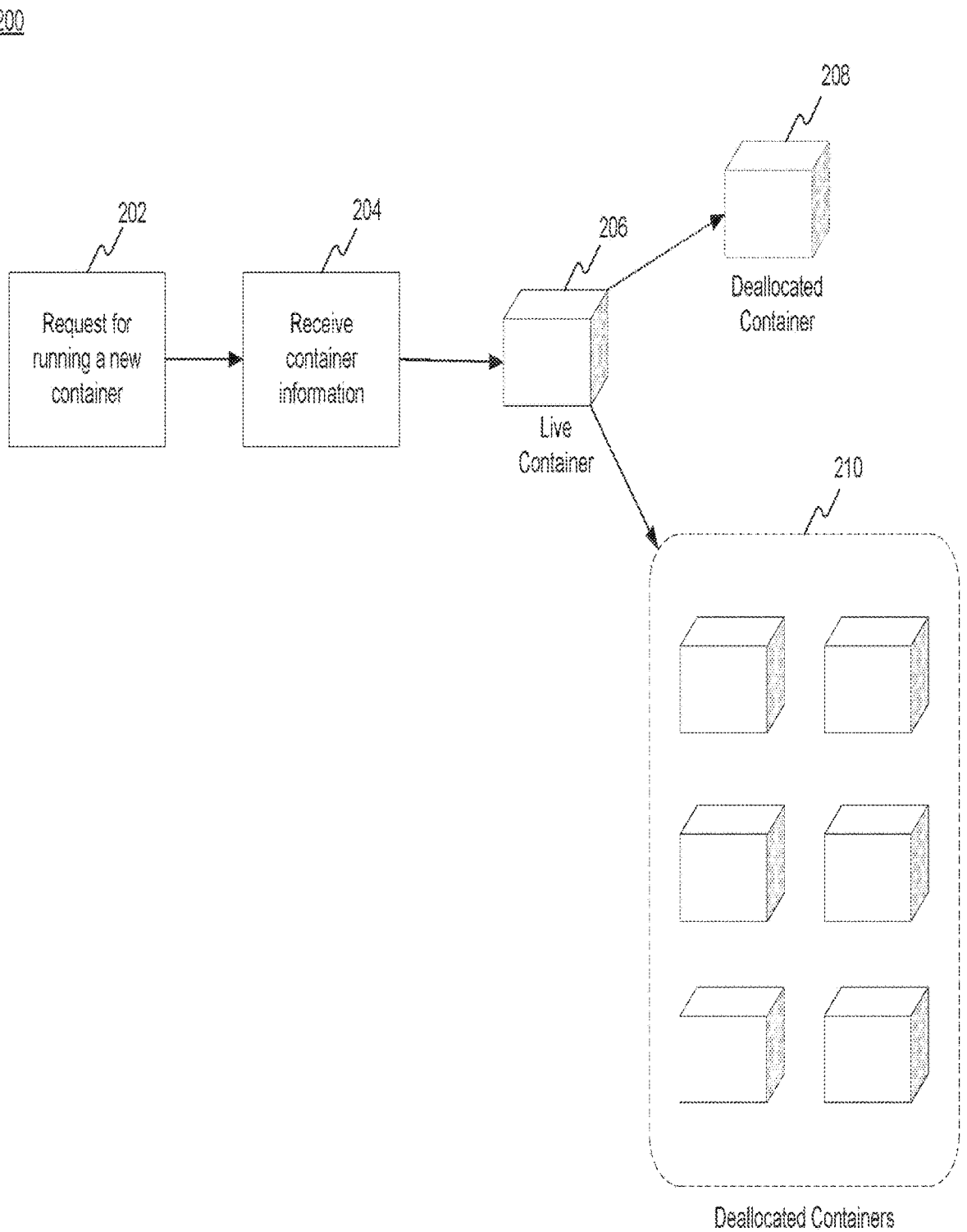
FIG. 2 is a block diagram depicting an exemplary process for reactivating deallocated virtual computing instances in accordance with disclosed embodiments.

FIG. 2 is an exemplary diagram of a process 200 for enabling full audit and recovery of deallocated resources, such as virtual computing instances. Process 200 may be implemented for one or more resource types, e.g., virtual machines 110, virtual container instances 112, serverless code instances, etc. In accordance with FIG. 1, process 200 may be implemented at servers 106, through a cloud orchestration tool within network 102 (e.g., a tool including functionalities provided by services such as IBM Cloud Orchestrator™, OpenStack™, Apache CloudStack™ Wrike™, or others), or through a dedicated application running in network 102 to perform process 200.

At step 202, a system, e.g., system 100, may receive a request for running or spinning up a new container or virtual computing instance. Consistent with the discussion above, the request may be received at servers 106, a cloud orchestration tool, or a dedicated application in network 102. At step 204, the system may receive desired virtual instance information. For example, as discussed further below, virtual instance information may include image or source information associated with the virtual instance, configuration or parameter information associated with the virtual instance, and/or memory contents (e.g., hard disk, temporary memory or cache, etc.) associated with the virtual instance. At step 206, the created virtual instance may be active in the environment. Step 208 represents an exemplary method of deallocating a virtual instance. In step 208, the virtual instance may be deallocated and its contents deleted. Thus, without the techniques discussed below, no future analysis may be executed on the virtual instance's content at the time of deallocation, nor may the virtual instance, in its state at the time of deallocation, be relaunched in the environment.

Disclosed embodiments provide solutions for deallocating virtual instances as described with reference to step 210. Contrary to the current methods described with reference to step 208, which result in virtual instance data being lost permanently, as described further below at step 210 the virtual instance may be deallocated from its host and automatically sent to storage rather than deleted. For example, deallocated virtual instances may be stored in data storage system 108 or in a remote data warehouse, e.g., audit warehouse, recovery warehouse, forensics warehouse. The virtual instance may be deallocated from the host and automatically sent to a dedicated storage place for audit and compliance. In some embodiments, the deallocated virtual instances may be compressed in a chain and may be filtered, for example, for privileges, date thresholds, etc. As discussed further below, the compressed chain may store an original or initial version of the deallocated virtual instance, and differential data representing changes (e.g., deltas) at each iteration of the instance. This means that full versions of each iteration of the instance need not be stored. Instead, the deltas or differences between versions may be stored. Additional compression may be applied to the stored data in some embodiments (e.g., lossless compression such as LZ compression, or probabilistic model compression, etc.). Thus, the deallocated virtual instance may be retrieved from storage on demand. For example, for every virtual instance that is spun up, the system may save its configuration, including its virtual instance source image, the image's version, the OS, the source of the image, installed plugins in the image, network configurations, RAM and CPU properties, hard disk and temporary memory contents, etc. Similarly, these and other types of parameters may be stored as the virtual instance is changed over time. As noted above, deltas or differences may be stored to reflect such differences over time. In embodiments where such deltas or differences are stored, when needed, the system may recover each state by sequentially recovering the previously saved states for any particular virtual instance.

In some embodiments, process 200 may enable old virtual instances to be retrieved and checked on demand. For example, a future auditor and/or forensic researcher could recover a specific virtual instance state. As described herein, a virtual instance state provides a snapshot of the virtual instance in a specific timeframe. The data warehouse (e.g., data storage systems 108) may store the initiated state of the virtual instance, and its initiated configuration and properties, and a later on state of that virtual instance. In some embodiments, the system stores a new virtual instance state on a periodic basis (e.g., every 10 minutes, every 30 minutes, every day, etc.) or may store a new state based on a rule or trigger (e.g., if CPU usage goes above 90%, or if a new process is detected in the virtual instance).

Figure 3:
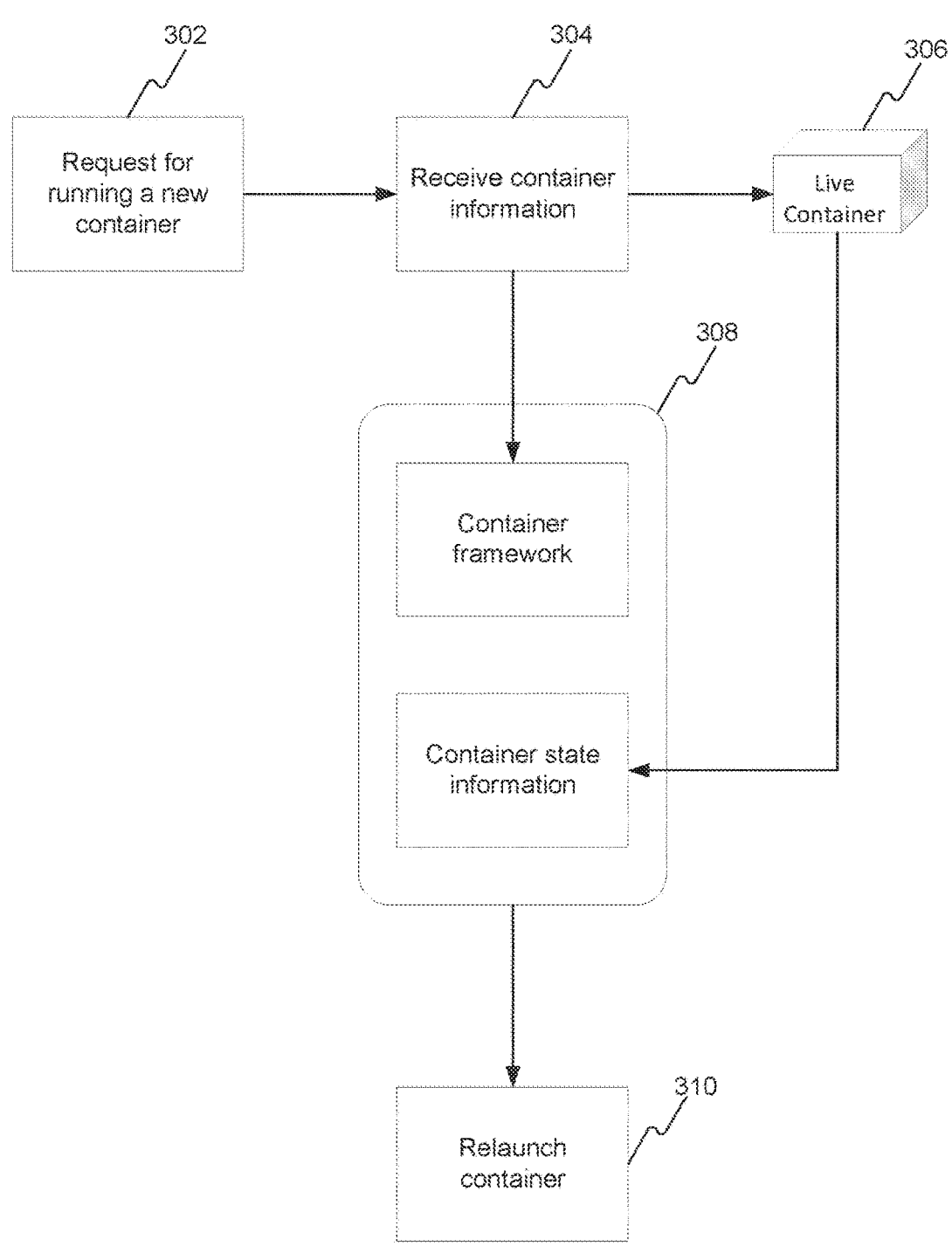
FIG. 3 is a block diagram depicting another exemplary process for reactivating deallocated virtual computing instances in accordance with disclosed embodiments.

FIG. 3 is another exemplary diagram of a process 300 for enabling full audit and recovery of deallocated resources. Process 300 may be implemented on one or more resource types, e.g., virtual machines 110 and/or virtual container instances 112. Consistent with the discussion above, process 300 may be implemented at servers 106, through a cloud orchestration tool within network 102 (e.g., a tool including functionalities provided by services such as IBM Cloud Orchestrator™, OpenStack™ Apache CloudStack™, Wrike™, or others), or through a dedicated application running in network 102 to perform process 300.

At step 302, a system, e.g., system 100, may receive a request for running (e.g., configuring, spinning up, deploying, etc.) a new container or virtual computing instance. Similar to the discussion above, the request may be received at server 106, a cloud management application within network 102, or another application in network 102. At step 304, the system may receive desired virtual instance information. For example, virtual instance information may include image information associated with the virtual instance, configuration information associated with the virtual instance, and/or memory contents associated with the virtual instance. In some embodiments, configuration information may include information of a particular virtual instance state. In other embodiments, configuration information may include information to create or spin up a new virtual instance in the environment (e.g., image or source data). At step 306, the created virtual instance may be active in the environment.

In some embodiments, each virtual instance that is instantiated and runs in the environment may have configuration information (e.g., the configuration information received at step 304) and an image that it is derived from. This information may be stored by the system at step 308. For example, the system may store the virtual instance's framework and the virtual instance's state information. As discussed above, the stored state information may, in some embodiments, reflect updates to the virtual instance over time (e.g., changes to its applications, settings, usage history, hard disk contents, temporary memory contents, network privileges, etc.).

In some embodiments, the virtual instance's framework may refer to the virtual instance's initiated configuration, e.g., the configuration at 306. The virtual instance's framework may contain information including the virtual instance's source image, the image's version, the OS, the source of the image, installed plugins in the image, network configurations, RAM and CPU properties, hard disk and temporary memory contents, etc.

The virtual instance's state information may refer to data stored when the virtual instance runs, e.g., at step 306. The system may record and save the virtual instance's commands and processes. For example, the host that runs the virtual instance may record and save the virtual instance's commands and processes by using kernel hooks or a driver that can duplicate the system calls from the virtual instance and by retrieving the memory mapping of that virtual instance. In other embodiments, an agent or a process of the virtual instance may send (e.g., periodically report) the actions performed by the virtual instance, the system calls made from the virtual instance, and other activity of the virtual instance to an external storage place (e.g., servers 106, a cloud orchestration tool in network 102, or a dedicated application in network 102). This stored data, e.g., the virtual instance's state information at one or multiple times, may be used to generate an instance of the virtual instance at a particular state, e.g., at a particular time.

As described above, with reference to FIG. 2, the virtual instance framework and state information may be stored such that only deviations or deltas in a chained sequence of virtual instances is saved, thus reducing the required storage space and facilitating the virtual instance recovery process. In addition, in some embodiments data compression may be used (e.g., lossless or lossy compression) to further reduce file storage space.

For example, the system may be triggered to archive a chained sequence of commands executed by a processor of the virtual computing instance when a status change of the virtual computing instance is detected (e.g., when the virtual computing instance enters a different state than its current state. When the status change is detected, the system may archive a first chain of activities. The first change of activities may include a sequence of one or more processes and/or commands executed by the processor of the virtual computing instance. In some embodiments, the archived sequence includes commands and/or processes executed between the time of the status change and the time of the most recent archival. At a later time, a second status change may be detected, causing the system to identify a second sequence of commands and/or processes. The system may compare the first and second sequence to identify commands and/or processes that differ from the first sequence. In some embodiments, the system may archive a subset of commands and/or processes that are different from the first sequence.

Like process 200, process 300 may enable a user to relaunch deallocated virtual instances, in operation 310. Thus, the previous states may be simulated and checked for audit, compliance, and investigations, which is not currently possible in systems that delete deallocated virtual instances. In process 300, a past virtual instance may be examined dynamically, even after it is no longer deployed or active. For example, a future auditor and/or forensic researcher may relaunch and reinstantiate the virtual instance identically to its original runtime configuration, e.g., by running the virtual instance state information.

In addition to the problem of accessing and relaunching deallocated virtual instances, current networks and environments lack efficient means for performing live tests on dynamic virtual instances without slowing the environment or influencing the virtual instances while they are being run in the production environment.

Figure 4:
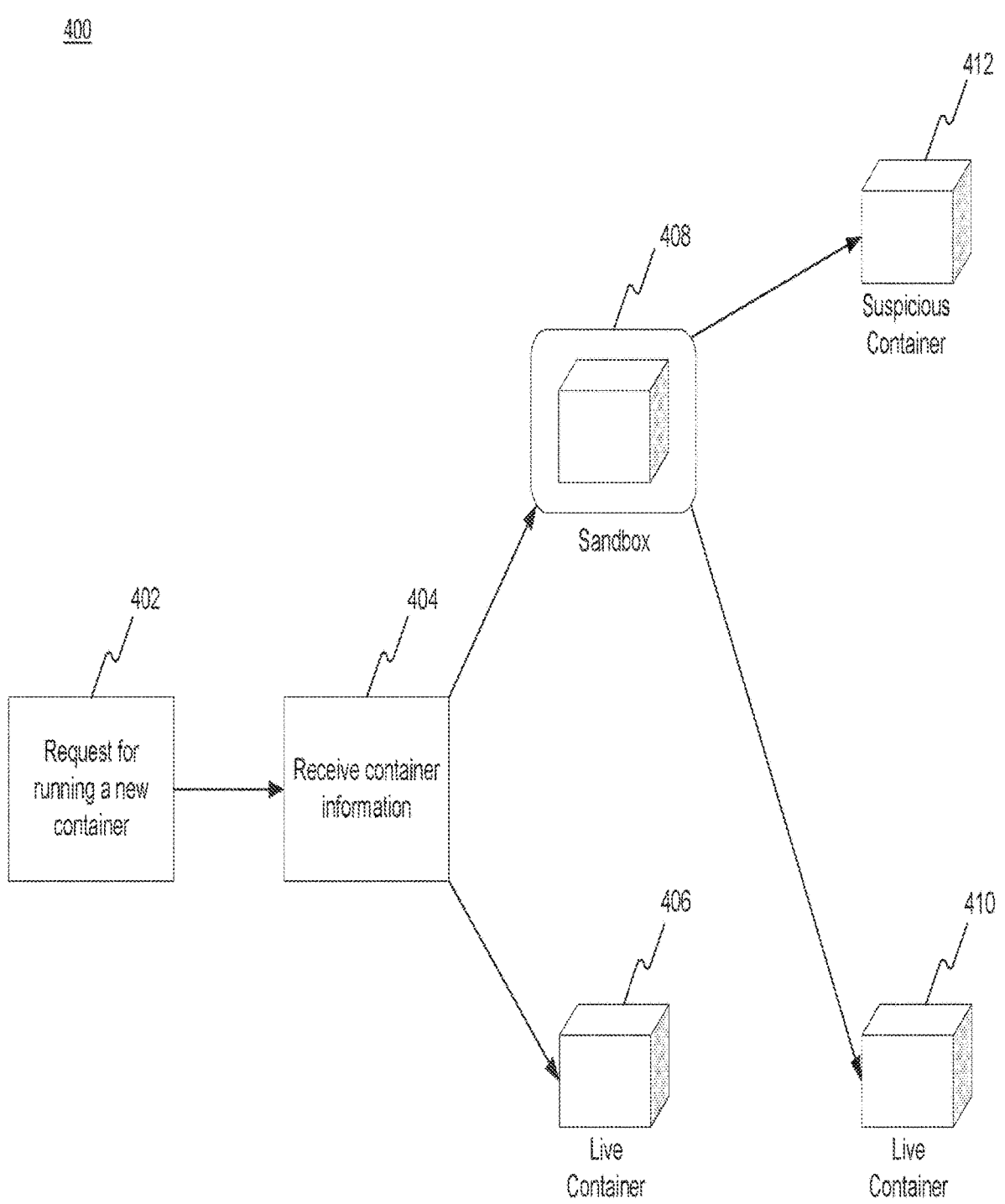
FIG. 4 is a block diagram depicting an exemplary process for performing checks on virtual computing instances in accordance with disclosed embodiments.

FIG. 4 is a diagram of an exemplary process 400 for performing tests on dynamic virtual instances in an environment. Consistent with the discussion above, process 400 may be implemented at servers 106, through a cloud orchestration tool within network 102 (e.g., a tool including functionalities provided by services such as IBM Cloud Orchestrator™, OpenStack™, Apache CloudStack™, Wrike™, or others), or through a dedicated application running in network 102 to perform process 400.

At step 402, a system, e.g., system 100, may receive a request for running (e.g., configuring, spinning up, deploying, etc.) a new container or virtual computing instance. The request may be received, for example, at servers 106, a cloud orchestration tool, or a dedicated application within network 102. At step 404, the system may receive desired virtual instance information. For example, virtual instance information may include image information associated with the virtual instance, configuration information associated with the virtual instance, and/or memory contents associated with the virtual instance.

In some embodiments, at step 404, based on the received information and before the virtual instance is run (e.g., before it is configured, deployed, or instantiated), the system may query a virtual instance whitelist, such that only irregular or new virtual instances may be scanned, e.g., at step 408. In some embodiments, the system may maintain a bank or a list of whitelisted virtual instances, so a specific virtual instance with a previously checked source image and configuration does not need to be sandboxed and checked again. Therefore, the sandbox can scan only the irregular and new virtual instances that are spun up in the environment.

If the virtual instance is listed in the whitelist, the system may launch the virtual instance to the production environment at step 406. If the virtual instance is irregular, or has not been previously audited, at step 408, the virtual instance may be sandboxed. In the sandbox, the system may perform security, compliance, and audit checks. The virtual instance may be isolated in the sandbox from the remainder of network 102, with reference to FIG. 1, so that if the virtual instance contains malicious code (e.g., malware), it will not affect other virtual instances or other network resources.

In some embodiments, at step 408, the system may generate a score for the sandboxed virtual instance based on validation, security, and compliance checks. For example, before a virtual instance may be deployed to a production environment, the virtual instance must meet a score threshold based on the results of the validation, security, and compliance checks. These checks and/or tests may include checks for: configuration, credentials, privileges, initiated caller, image source, security components, etc. The score may indicate, for example, a number of successfully passed checks.

If the sandboxed virtual instance passes the checks at step 408, or if the virtual instance has a score within a certain range or above or below a particular threshold, at step 410, the virtual instance may be elevated to a production environment. In some embodiments, when the virtual instance is elevated to the production environment, the virtual instance's source image and configuration may be added to the whitelist, such that subsequent virtual instances with the same source image and configuration need not be sandboxed and checked prior to deployment to the production environment.

If the sandboxed virtual instance does not pass the checks at step 408, the system may take one or more actions at step 412. For example, the virtual instance may be tagged as being suspicious, thereby triggering, for example, one or more system alerts. In other embodiments, the suspicious virtual instance may be suspended or blocked. Thus, process 400 may enable live checks of virtual instances to prevent suspicious virtual instances from being elevated to a production environment. In accordance with the discussion above, process 500 may be implemented at servers 106, through a cloud orchestration tool within network 102 (e.g., a tool including functionalities provided by services such as IBM Cloud Orchestrator™, OpenStack™ Apache CloudStack™, Wrike™, or others), or through a dedicated application running in network 102 to perform process 500.

Figure 5:
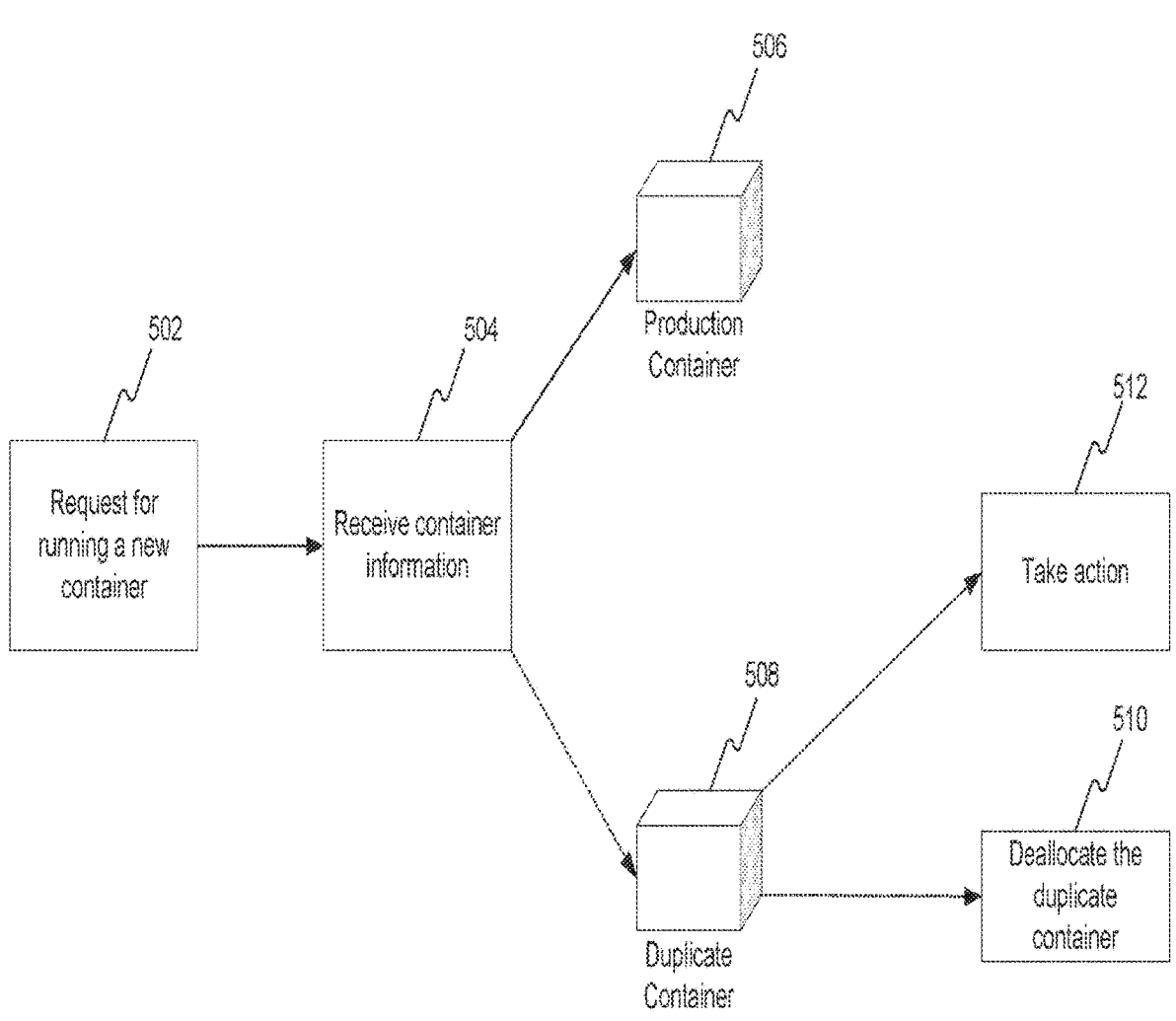
FIG. 5 is a block diagram depicting another exemplary process for performing checks on virtual computing instances in accordance with disclosed embodiments.

FIG. 5 is a diagram of another exemplary process 500 for performing tests on dynamic virtual instances in an environment. In process 500, a duplicated and mirrored virtual instance may run in parallel with the original virtual instance being run in a production environment. The duplicated or mirrored virtual instances may thus not be operational, but may mimic actual live, production virtual instances.

At step 502, a system, e.g., system 100, may receive a request for running (e.g., spinning up, configuring, deploying, etc.) a new container or other virtual computing instance. The request may be received at, for example, servers 106, cloud orchestration tools within network 102, or dedicated applications within network 102. At step 504, the system may receive desired virtual instance information. For example, virtual instance information may include image information associated with the virtual instance, configuration information associated with the virtual instance, and/or memory contents associated with the virtual instance. This information may be used to generate a new (e.g., cloned or mirrored) virtual instance.

At step 506, the virtual instance may be elevated to a production environment. Simultaneously or in tandem, at step 508, a duplicate virtual instance may run in a test environment. In the test environment, as in the sandbox described above, the duplicate virtual instance may undergo security, compliance, and audit checks. Because in accordance with FIG. 5 these checks may be run on the duplicate virtual instance in a separate environment, there is no negative effect (e.g., no slow-down, decrease in efficiency, etc.) on the operation of the virtual instance that is the production environment. Nor do the checks slow the performance of the production environment.

In some embodiments, e.g., at step 510, the duplicate virtual instance may be deallocated after undergoing the checks at step 508, thereby freeing resources to perform other processes or check additional duplicate virtual instances. In another embodiment, the duplicate virtual instance may continuously mirror the original virtual instance, enabling continuous, parallel monitoring of the original virtual instance from outside the production environment.

In some embodiments, as previously described, the system may generate a score for the duplicate virtual instance based on validation, security, and compliance checks. For example, at step 512, if the duplicate virtual instance's score does not meet a predetermined threshold, the system may generate an alert or may suspend both the duplicate and original virtual instances to mitigate potential risk. In some embodiments, if a security check is failed on the duplicate virtual instance, the system may trigger an action on the original virtual instance in the production environment, for example, terminating the original virtual instance, etc. In some embodiments, the system may include auto-remediation steps such as auto-rotation of credentials that were used in a suspicious virtual instance as these credentials may have been stolen.

Figure 6:
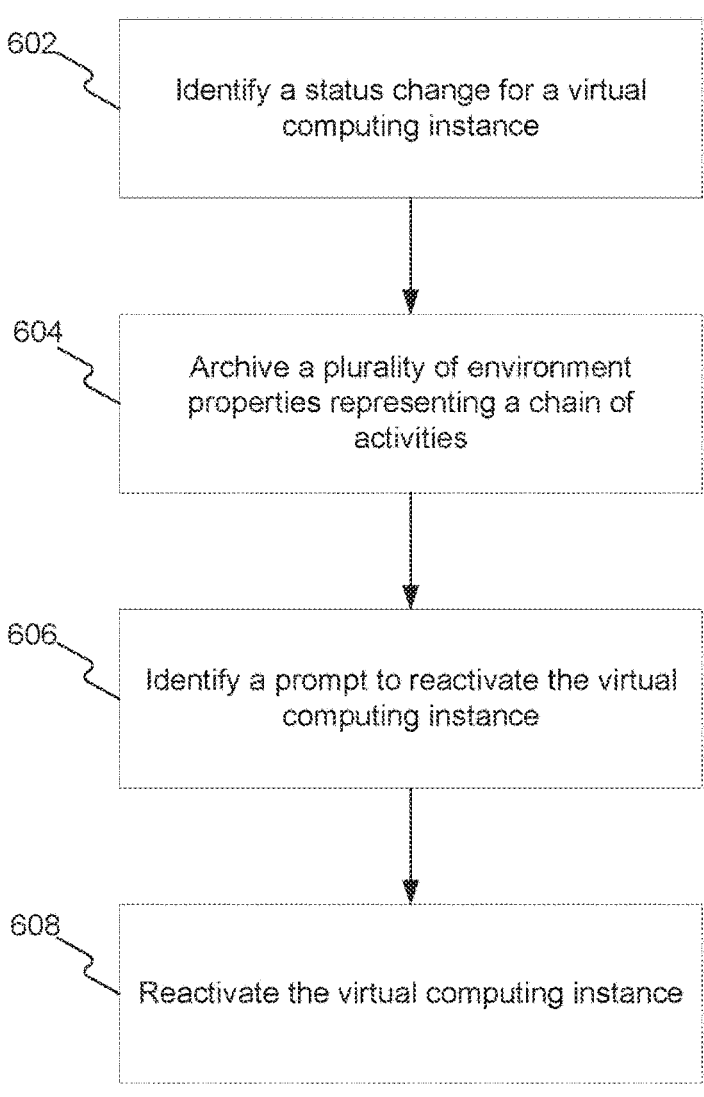
FIG. 6 is a flowchart depicting an exemplary process for enabling recovery of deactivated virtual computing instances that were previously instantiated in a dynamic virtualized computing environment in accordance with disclosed embodiments.

FIG. 6 is a flowchart depicting an exemplary process 600 for enabling recovery of deactivated virtual computing instances that were previously instantiated in a dynamic virtualized computing environment. Process 600 may be performed, for example, in the system environments of FIG. 1. In particular, process 600 may be implemented at servers 106, through a cloud orchestration tool within network 102 (e.g., a tool including functionalities provided by services such as IBM Cloud Orchestrator™ OpenStack™, Apache CloudStack™, Wrike™, or others), or through a dedicated application running in network 102 to perform process 600.

Process 600 may include an operation 602 of identifying a status change for a virtual computing instance. For example, a status change may be a transition from a run state to a pause state, a run state to a stop state, a pause state to a run state, etc. The status change may be when a virtual computing instance is transitioned from a runtime phase to a deactivated, or deallocated phase. The virtual computing instance may be a virtual machine, e.g., virtual machine 110, or virtual container instance, e.g., virtual container 112, or serverless code, and may be hosted by network 102. In some embodiments, upon the transition to the deactivated phase, the virtual computing instance may be stored in a sandbox environment. The identification of the status change for the virtual computing instance may, in some embodiments, be based on a notification or report from a cloud orchestration tool. For example, cloud management tools such as IBM Cloud Orchestrator™, OpenStack™, Apache CloudStack™, Wrike™ Kubernetes™ and others may provide such notifications or reports upon identifying resources to be spun down or deactivated.

Process 600 may also include an operation 604 of archiving a plurality of environment properties representing a chain of activities including one or more activities executed by a processor of the virtual computing instance. The one or more activities may include, e.g., a command executed by a processor of the virtual computing instance, a system call, a process operation, etc. In other embodiments, the processor may archive a chain of activities, for example, a sequence of activities executed by the processor of the virtual computing instance. In some embodiments, the chain of activities may be an archived chain of the deviations of one state or action to the next state or action. For example, the first state of the virtual computing instance may be archived in full, and subsequently archived states may only include deviations (e.g., "deltas") from the archived first state. The chain may include, for example, the order of the processor's activities including the activities' contexts (e.g., execution time, order of commands, the commands' deviations from the previous executed actions, and the affected changes, etc.).

In other embodiments, the system may archive one or more environment properties, e.g., image information associated with the virtual computing instance, configuration information associated with the virtual computing instance, memory contents associated with the virtual computing instance, and the context switches, process list, installed drivers, open network sockets, etc. of the processor of the virtual computing instance. The image information may specific the image or source data that was used to initially spin up or deploy the virtual instance. The configuration information, as discussed above, may specify various types of parameters for the virtual instance, such as its application settings, usage activity, connections to other network resources, privileges, credentials, and more. The memory contents may indicate what is contained in the hard disk and/or temporary memory (e.g., RAM or Flash) associated with the virtual instance.

For example, in some embodiments, the system may store a container framework and container state information reflecting the configuration of the virtual instance at a particular time. In other embodiments, the system may store credential data (e.g., embedded passwords, tokens, certificates, keys, etc.) associated with the virtual computing instance. In some embodiments, the system may further archive activities, e.g., commands and/or processes, run by the virtual computing instance during the runtime phase (e.g., local software execution activity, communications with external network resources, etc.).

In some embodiments, the system may archive multiple versions of the activities and/or environment properties, e.g., at different times. As described above with reference to FIGS. 2 and 3, these versions may enable a user to reactivate a static version of a virtual instance at a specific time, or a dynamic version of a virtual instance that may run through each virtual instance's state from the time the virtual instance was created to the time of the most recent archived state. In some embodiments, the system may store a compressed chain of the multiple versions of a particular virtual instance, where the compressed chain represents one or more differences between the multiple versions. By storing the differences or deltas, it is thus unnecessary to store the entire instances themselves.

Process 600 may also include an operation 606 of identifying a prompt to reactivate a virtual computing instance. The prompt may be associated with a user request or automated system monitoring. For example, the prompt may be in response to a suspicious container being identified, e.g., via process 400. Further, the prompt may be part of a command to reinstantiate a group of virtual instances (e.g., to reinstantiate a complete system or environment). The prompt may include indications of one or more checks to be conducted on the virtual instance. In other embodiments, a particular historic instance of a virtual instance may be requested, e.g., to retrieve lost data.

Process 600 may also include an operation 608 of reactivating the virtual computing instance based on the plurality of environment properties and the chain of activities archived at the time of a previous status change. In some embodiments, reactivating the virtual computing instance may include reinstantiating the virtual computing instance based on its state information, e.g., environment properties, and the actions performed by the virtual computing instance during the runtime phase. For example, the virtual computing instance may be reinstantiated to its state at the time of the status change. In some embodiments, the system may reactivate the virtual computing instance based on a hook function (e.g., operating system hook), prompting the loading of various configuration settings for the virtual instance.

The above steps of process 600 may be performed on a plurality of virtual computing instances. Thus, attributes, environment properties, and/or activities associated with the plurality of virtual computing instances may be archived in real-time to capture a present state of the virtual computing instance at the time of archival, which allows a virtual computing instance to be reinstantiated to its state at a particular time. In some embodiments, the archived activities, environment properties, and/or attributes may be filtered, for example, based on whether the plurality of virtual computing instances have privileged attributes and/or embedded credentials. Attributes, environment properties, and/or activities may also be filtered based on runtime activity involving access to one or more sensitive network resources (e.g., access-restricted resources, resources holding sensitive data, etc.).

In other embodiments, the system may receive a request to reactivate a group of virtual computing instances. For example, a group of computing instances may be associated with a DevOps process or environment. In such a situation, a request may be made to reinstantiate the entire DevOps environment, or a specific portion of it. Further, in some situations defined collections or groupings of virtual instances may be reinstantiated. For example, groups of virtual instances may be defined based on criteria such as their source or creator, their time of creation, the applications they contain, the external network resources they have accessed, the credentials they contain, their network address or port number data, and various other criteria.

Figure 7:
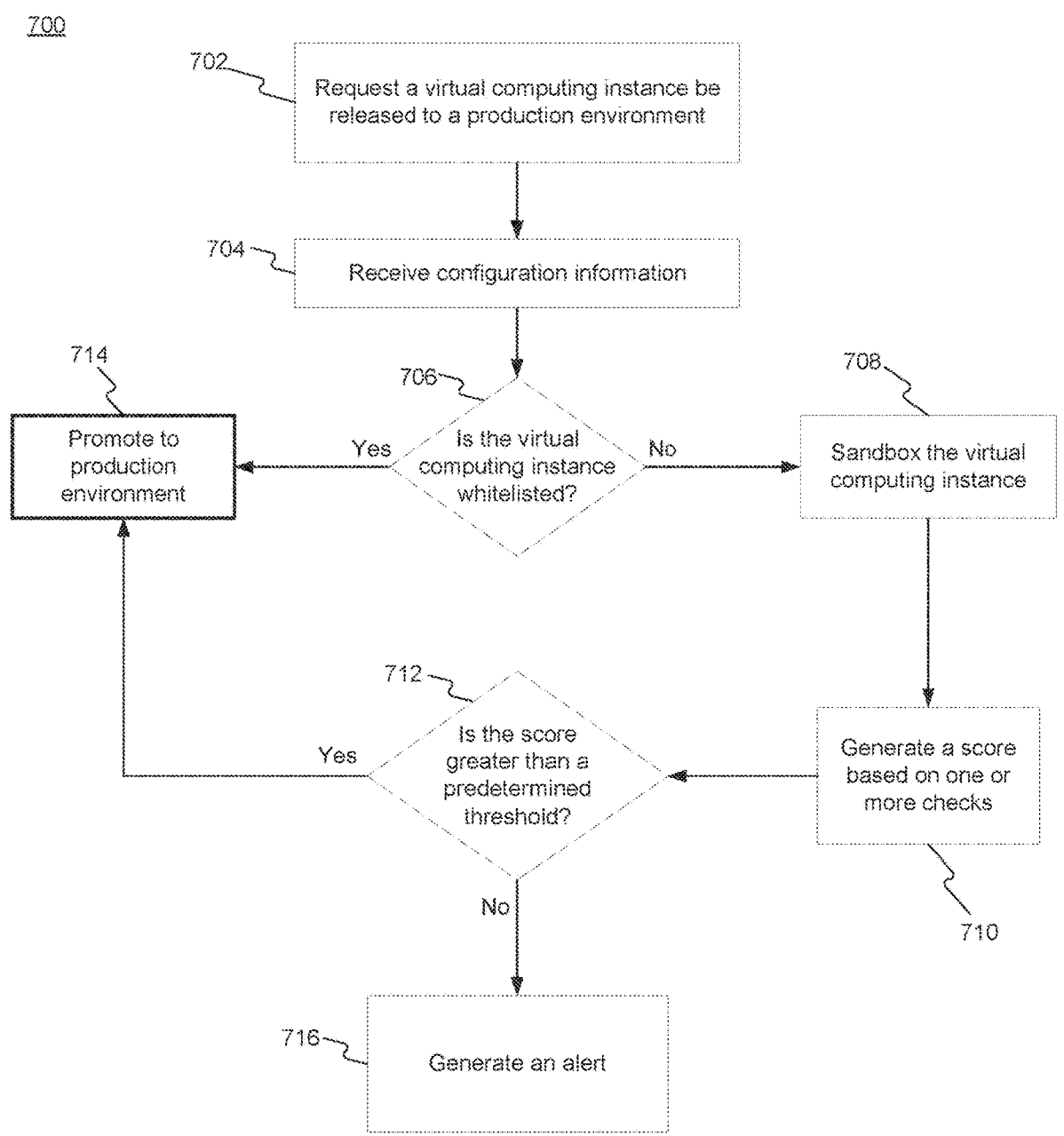
FIG. 7 is a flowchart depicting an exemplary process for performing checks on virtual computing instances in accordance with disclosed embodiments.

FIG. 7 is a flowchart depicting an exemplary process 700 for performing checks on virtual computing instances in a dynamic virtualized computing environment. Process 700 may be performed, for example, in the system environments of FIG. 1. Consistent with the above discussion, process 700 may be implemented at servers 106, through a cloud orchestration tool within network 102 (e.g., a tool including functionalities provided by services such as IBM Cloud Orchestrator™, OpenStack™ Apache CloudStack™, Wrike™, or others), or through a dedicated application running in network 102 to perform process 700.

Process 700 may include an operation 702 for receiving a request that a virtual computing instance be released to a production environment. The request may be generated by an automated process or may be received from a user. For example, in some embodiments the request may come from a cloud orchestration tool, as discussed above. Further, in some embodiments the request may originate from a DevOps process system, which may identity requests for particular virtual instances to be deployed (e.g., spun up, configured, or deployed).

Process 700 may also include an operation 704 for receiving configuration information associated with the virtual computing instance. Configuration information may include, for example, image or source information associated with the container, configuration information associated with the container (e.g., settings, parameters, usage activity data, etc.), and/or memory contents (e.g., from hard disk and/or RAM) associated with the virtual instance. In other embodiments, configuration information may include a virtual instance framework and virtual instance state information, as discussed above.

Process 700 may include an operation 706 of determining whether the requested virtual computing instance is whitelisted. For example, the system may query a whitelist database to identify a virtual instance having the same framework and state information. If the system identifies a similar virtual instance or determines that the virtual instance has already been checked (e.g., in its current state), then the system may proceed to operation 714 and promote the virtual computing instance to a production environment.

If the virtual computing instance is not whitelisted, process 700 may include an operation 708 for sandboxing the virtual computing instance. In some embodiments, process 700 may further include generating a duplicate virtual computing instance for testing. As described above, the duplicate or mirrored virtual computing instance may not interfere with the operation of the actual, operational instance.

Process 700 may include an operation 710 of generating a score based on one or more checks applied to the sandboxed or duplicate virtual computing instance. As previously described, the checks may be one or more required security and/or validity checks. In some embodiments, the score may be generated based on the number of checks passed by the virtual computing instance. In other embodiments, the generated score may be determined by one or more algorithms based on the results of the checks.

Process 700 may include an operation 712 to determine whether the generated score is greater than a predetermined threshold. In some embodiments, the virtual computing instance may be promoted into production (e.g., live environment) if the score generated by operation 710 is within a predetermined range, or is below a predetermined threshold. If the score is greater than the predetermined threshold, process 700 may include an operation 714 such that the virtual computing instance is promoted to a production environment. On the other hand, if the score is less than the predetermined threshold, process 700 may include an operation 716 for generating an alert, e.g., an alert to a system administrator. In some embodiments the alert may include a trigger for suspending the virtual instance or may trigger a credential rotation (e.g., invalidating a current credential associated with the virtual instance, and potentially replacing it with a new substitute credential).

Figure 8:
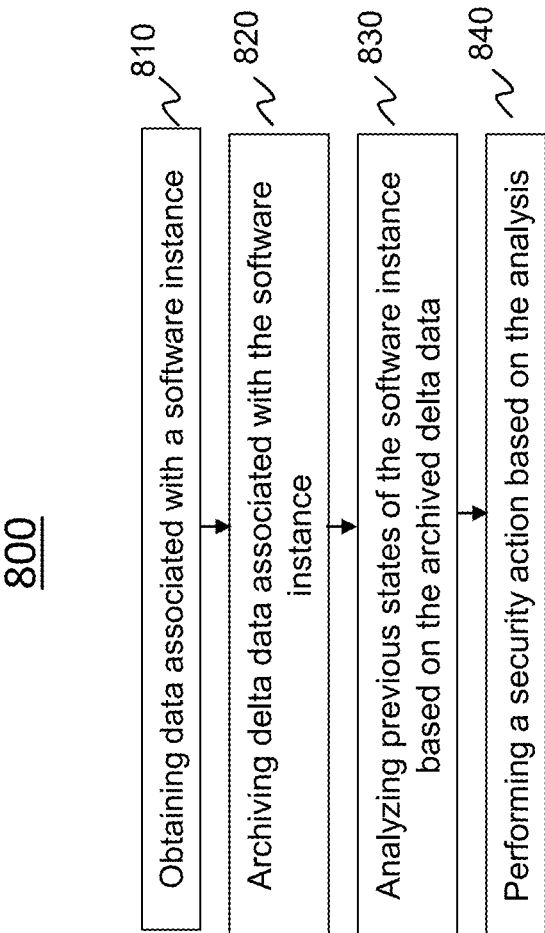
FIG. 8 is a flowchart depicting an exemplary process for performing analysis of data associated with software instances, consistent with disclosed embodiments.

FIG. 8 is an example flowchart for analysis of data associated with software instances, consistent with disclosed embodiments. Process 800 may be performed by at least one processing device of a server, such as server 106, as described above. Consistent with above embodiments, a non-transitory computer readable medium may contain instructions that when executed by a processor cause the processor to perform process 800. Further, process 800 is not necessarily limited to the steps shown in FIG. 8 and any steps or processes of the various embodiments described throughout the present disclosure may also be included in process 800, including those described above with respect to FIGS. 1-7.

In step 810, process 800 may include obtaining data associated with a software instance. A software instance may comprise, for instance, each separate copy of a software program or workload deployed in the software environment. In some embodiments, the software instance may be represented in a continuous development or continuous deployment pipeline prior to deployment of the software instance. Continuous development may comprise a continuous delivery of software through production in short cycles, ensuring that software is reliably released at any time automatically. For example, continuous development may comprise improving software continuously, piece by piece rather than in one large batch. Further, continuous development may comprise testing of software immediately. The software instance may comprise a software container according to some use cases. According to such use cases, the software container may comprise packages of software that contain all necessary elements to run the software in any environment.

Consistent with the disclosed embodiments, data may comprise code elements. The code elements may comprise lines or characters of code. Further, data may comprise libraries or modules, for example a third-party library or open source modules. Data may comprise data that has changed after a compilation stage in an environment. In some embodiments, data may comprise attributes associated with environment variables. In addition, data may comprise information about one or more aspects of the data ("metadata"). Such metadata may comprise a change of context, time, date, user identification data, resource address data, user activity history, application identification data, application activity history, security permissions, etc. In some embodiments, data may comprise configuration data for the software instance.

In step 820, process 800 may include archiving, in at least one data storage system, delta data associated with the software instance, the delta data representing a plurality of differences between a first state of the data associated with the software instance and a second state of the data associated with the software instance, wherein the plurality of differences are based on a plurality of operations performed on at least one of the data associated with the software instance or the software instance. The plurality of differences may be based on, for example, differences in code binaries, compiled code, segments of code, code metadata, code variables, data accessed by code, user identities that access the code, application identities that access the code, etc. The plurality of operations may include, for instance, editing, adding, deleting, moving, etc., either to the code or to metadata associated with the code. The archiving may comprise, for example, moving data that is no longer active to another storage system to free up primary storage and improve system performance, as discussed above. In some embodiments, storing delta data is a way of storing data representing differences, or deltas, between different versions or instances of data or code. Delta changes of data could be very small changes but could also be dramatic changes. The type of the delta data is depended on the data type, as the definitions and example in section 00114 above. Examples: data as a code, the changes will be different line of code, data as environment variables would be changes in the data that is assigned and stored in these environment variables, etc. Delta changes could be defined by a time based slices (every minute/hour/etc the changes will be saved) or by commit based (every time the developer upload the application code to the code repository the changes will be saved) or by the DevOps pipeline cycles (any time that there will be "build" stage running or "deploy" stage done the changes will be saved) and more. The core value of saving delta changes is that each delta change is very small and easy to store, the system doesn't need to store all the data that isn't change, only the state zero should be saved in full and afterwards if all the delta changes are saved in a valid chain and in the valid order, any state along the way can be reproduce and reinitiate.

In some embodiments, archived delta data may be stored in at least one data storage system in association with time information indicating when the plurality of operations were performed. For example, the at least one data storage system may be data storage systems 108, as described above with reference to FIG. 1. In some embodiments, the data storage system may comprise a local storage or a remote storage. The storing may occur on hard disks, cloud storage services, or on a relational database. Further, the data storage system may comprise a short term and a long term storing system. The storing may be automatic (e.g., based on events) or performed by a user. In some embodiments, the time information may comprise a time stamp for when an operation occurred.

In some embodiments, process 800 may further comprise archiving state data associated with the second state of the data associated with the software instance. The second state of the data may differ from the first state of the data. Further, the archiving may further comprise compressing the plurality of differences between the first state of the data associated with the software instance and the second state of the data associated with the software instance into a chain of activities. The plurality of differences between the first state of the data associated with the software instance and the second state of the data associated with the software instance may comprise at least one of image information associated with the software instance, memory contents associated with the software instance, or configuration information associated with the software instance. In some embodiments, image information may comprise an image version, image operating system, the source of the image, or installed plugins in the image. Further, configuration information may include information related to a virtual instance state. Configuration information may also include information to create or spin up a new instance. In other embodiments, configuration information may comprise one or more parameters of the software instance (e.g., code language, file size, types of variables used, creation date, creation time, creator identity, associated applications, associated metadata, data sources accessed, privileges, credentials, tokens, etc.). Process 800 may also further comprise archiving multiple versions of the chain of activities, each version being associated with a different state of the data associated with the software instance.

In some embodiments, process 800 may further comprise deallocating the software instance and accessing archived delta data associated with the deallocated software instance, as described above in reference to FIG. 2 and FIG. 3. As an illustration, process 800 may further comprise reinstantiating the deallocated software instance based on the associated archived delta data and performing an audit on the reinstantiated software instance, as described above in reference to FIG. 4 and FIG. 6.

In some embodiments, the archiving may be performed on a periodic basis. For example, the periodic basis may be on a daily, weekly, or monthly basis. Alternatively, a user may configure the archiving pattern or timing. In some embodiments, the archiving may further comprise a continual archiving of the delta data upon identification of a state change for the software instance. Such a state change may be, for example, updates to the code of the software instance, updates metadata associated with the software instance, updates to data that the software instance accesses, updates to privileges or permissions associated with the software instance, updates to the environment in which the software instance is to be run, etc.

In step 830, process 800 may include analyzing one or more previous states of the software instance based on the archived delta data. The analysis may include, for example, using a machine learning algorithm. The machine learning algorithm may, for instance, use a historical body of data regarding analysis of other software instances. The historical body of data may determine, in the machine learning model, what parameters of software instances should be analyzed. Further, the analysis may comprise simulating one or more previous states of the software instance based on the archived delta data. That is, without fully redeploying the software instance in a production environment, the instance may be recreated or displayed as it existed according to various prior states. For example, if a software instances underwent five different updates in its lifecycle, the instance may be simulated or displayed as it existed in each of the five prior states. In addition, the simulating may comprise simulation in a sandbox environment, as described above in reference to FIG. 4. This may allow for added security by isolating the instance from other resources (e.g., from the development pipeline).

In step 840, process 800 may include performing a security action based on the analysis of the one or more previous states of the software instance based on the archived delta data. In some embodiments, the security action may comprise at least one of an alert, a report displayed or transmitted to a user or other application, a blocking of an action, or a permission of an action. Further, the security action may comprise performing an audit of the software instance. Additionally, the security action may be performed automatically. As another option, the security action may be performed iteratively on each of a plurality of sets of delta data associated with the software instance.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer-readable medium including instructions that, when executed by at least one processor, cause the at least one processor to perform operations for analysis of data associated with software instances, the operations comprising:

obtaining data associated with a software instance;

archiving, in at least one data storage system, delta data associated with the software instance, the delta data representing a plurality of differences between a first state of the data associated with the software instance and a second state of the data associated with the software instance, wherein the plurality of differences are based on a plurality of operations performed on at least one of the data associated with the software instance or the software instance;

analyzing one or more previous states of the software instance by simulating the one or more previous states of the software instance based on the archived delta data; and performing a security action based on the analysis of the one or more previous states of the software instance based on the archived delta data.

2. The non-transitory computer-readable medium of claim 1, wherein the software instance is represented in a continuous development or continuous deployment pipeline prior to deployment of the software instance.

3. The non-transitory computer-readable medium of claim 1, wherein the archived delta data is stored in at least one data storage system in association with time information indicating when the plurality of operations were performed.

4. The non-transitory computer-readable medium of claim 1, wherein the software instance is a software container.

5. The non-transitory computer-readable medium of claim 1, wherein the operations further comprise archiving state data associated with the second state of the data associated with the software instance.

6. The non-transitory computer-readable medium of claim 1, wherein the simulating further comprises simulation in a sandbox environment.

7. The non-transitory computer-readable medium of claim 1, wherein the security action comprises at least one of: an alert, a report, a blocking of an action, or a permission of an action.

8. The non-transitory computer-readable medium of claim 1, wherein the security action is performed automatically.

9. The non-transitory computer-readable medium of claim 1, wherein the operations further comprise:

deallocating the software instance; and accessing archived delta data associated with the deallocated software instance.

10. The non-transitory computer-readable medium of claim 9, wherein the operations further comprise:

reinstantiating the deallocated software instance based on the associated archived delta data; and performing an audit on the reinstantiated software instance.

11. The non-transitory computer-readable medium of claim 1, further comprising continually archiving the delta data upon identification of a state change for the software instance.

12. A computer-implemented method for enabling storage and analysis of data associated with software instances, the operations comprising:

obtaining data associated with a software instance;

archiving, in at least one data storage system, delta data associated with the software instance, the delta data representing a plurality of differences between a first state of the data associated with the software instance and a second state of the data associated with the software instance, wherein the plurality of differences are based on a plurality of operations performed on at least one of the data associated with the software instance or the software instance;

analyzing one or more previous states of the software instance by simulating the one or more previous states of the software instance based on the archived delta data; and performing a security action based on the analysis of the one or more previous states of the software instance based on the archived delta data.

13. The computer-implemented method of claim 12, wherein the archiving further comprises compressing the plurality of differences between the first state of the data associated with the software instance and the second state of the data associated with the software instance into a chain of activities.

14. The computer-implemented method of claim 13, wherein the operations further comprise archiving multiple versions of the chain of activities, each version being associated with a different state of the data associated with the software instance.

15. The computer-implemented method of claim 12, wherein the plurality of differences between the first state of the data associated with the software instance and the second state of the data associated with the software instance comprise at least one of: image information associated with the software instance, memory contents associated with the software instance, or configuration information associated with the software instance.

16. The computer-implemented method of claim 15, wherein the configuration information comprises one or more parameters of the software instance.

17. The computer-implemented method of claim 12, wherein the security action comprises performing an audit of the software instance.

18. The computer-implemented method of claim 12, wherein the archiving is performed on a periodic basis.

19. The computer-implemented method of claim 12, further comprising continually archiving the delta data upon identification of a state change for the software instance.

20. The computer-implemented method of claim 12, further comprising performing an iterative security action on each of a plurality of sets of delta data associated with the software instance.

* * * * *